United States Patent [19]
Hooks et al.

[11] Patent Number: 5,761,452
[45] Date of Patent: Jun. 2, 1998

[54] BUS ARBITER METHOD AND SYSTEM

[75] Inventors: Douglas A. Hooks; Drew J. Dutton, both of Austin, Tex.

[73] Assignee: Advanced Micro Devices, Inc., Sunnyvale, Calif.

[21] Appl. No.: 617,413

[22] Filed: Mar. 18, 1996

[51] Int. Cl.$^6$ ................................................. G06F 13/00
[52] U.S. Cl. ...................................... 395/296; 395/293
[58] Field of Search ................................. 395/293, 383, 395/299, 729, 730, 296

[56] References Cited

U.S. PATENT DOCUMENTS

| | | |
|---|---|---|
| 4,096,571 | 6/1978 | Vander Mey . |
| 4,245,344 | 1/1981 | Richter . |
| 4,339,808 | 7/1982 | North . |
| 4,682,282 | 7/1987 | Beasley . |
| 4,924,376 | 5/1990 | Ooi .......................... 395/383 |
| 4,953,081 | 8/1990 | Feal et al. . |
| 4,972,313 | 11/1990 | Getson, Jr. et al. . |
| 4,974,148 | 11/1990 | Matteson . |
| 5,146,596 | 9/1992 | Whittaker et al. . |
| 5,245,322 | 9/1993 | Dinwiddie, Jr. et al. . |
| 5,265,223 | 11/1993 | Brockmann et al. . |
| 5,274,763 | 12/1993 | Banks . |
| 5,345,566 | 9/1994 | Tanji et al. . |
| 5,392,033 | 2/1995 | Oman et al. . |
| 5,396,602 | 3/1995 | Amini et al. . |
| 5,404,463 | 4/1995 | McGarvey . |
| 5,463,624 | 10/1995 | Hogg et al. . |
| 5,467,454 | 11/1995 | Sato . |
| 5,471,590 | 11/1995 | Melo et al. . |
| 5,524,235 | 6/1996 | Larson et al. . |
| 5,526,017 | 6/1996 | Wilkie . |
| 5,533,205 | 7/1996 | Blackledge, Jr. et al. . |
| 5,535,341 | 7/1996 | Shah et al. . |
| 5,546,546 | 8/1996 | Bell et al. . |
| 5,572,686 | 11/1996 | Nunziata et al. . |
| 5,574,867 | 11/1996 | Khaira . |
| 5,583,999 | 12/1996 | Sato et al. . |
| 5,636,364 | 6/1997 | Emma et al. ............................ 395/467 |

FOREIGN PATENT DOCUMENTS

| | | |
|---|---|---|
| 0 121 030 A1 | 10/1984 | European Pat. Off. . |
| 0 629 955 A1 | 12/1994 | European Pat. Off. . |
| 0 718 774 A1 | 6/1996 | European Pat. Off. . |
| 2 165 726 | 4/1985 | United Kingdom . |
| 93/16434 | 8/1993 | WIPO . |
| 95/28786 | 10/1995 | WIPO . |

OTHER PUBLICATIONS

IBM Technical Disclosure Bulletin, Apr. 1995, vol. 38, "Micro Channel Architecture for Real-Time Multimedia", pp. 535-538.

IBM Technical Disclosure Bulletin, Oct. 1992, vol. 35, "Extended Micro Channel for Realtime Multimedia Applications", pp. 8-10.

IBM Technical Disclosure Bulletin, May 1989, vol. 31, "Priority Scheduling Algorithm", pp. 271-272.

Patent Abstracts of Japan, JP2048765, Feb. 19, 1990.

International Search Report for PCT/US 96/09756, dated Nov. 7, 1996.

(List continued on next page.)

*Primary Examiner*—Jack B. Harvey
*Assistant Examiner*—David A. Wiley
*Attorney, Agent, or Firm*—B. Noel Kivlin; Conley, Rose & Tayon

[57] ABSTRACT

An improved bus arbitration system comprising an information bus, first and second bus masters connected to the bus and a bus arbiter for controlling ownership of the bus. The first bus master is adapted to perform speculative pre-fetching and has a first REQ signal for requesting ownership of the bus and an SP signal for indicating when a bus ownership request is for a speculative pre-fetch. The second bus master has a second REQ signal for requesting ownership of the bus. The bus arbiter is configured such that when the first bus master asserts its REQ signal and its SP signal and the second bus master asserts its REQ signal, the bus arbiter assigns higher priority to the second bus master in response to the SP signal.

15 Claims, 4 Drawing Sheets

OTHER PUBLICATIONS

International Search Report for PCT/US 96/11981, dated Feb. 25, 1997.

PCI Local Bus Multimedia Design Guide, Revision 1.0, Mar. 29, 1994, pp. 1–40.

Peripheral Component Interconnect (PCI) Revision 1.0 Specification, Jun. 22, 1992, cover page and pp. 26–33.

BUS ARBITER METHOD AND SYSTEM

BACKGROUND OF THE INVENTION

1. Field of the Invention

The invention relates to the field of bus arbitration in a computer system, and more particularly to prioritizing bus requests in a system employing speculative pre-fetches.

2. Description of the Relevant Art

Computer architectures generally include a plurality of devices interconnected by one or more busses. As an example, conventional computer systems typically include a central processing unit (CPU) coupled to main memory, cache memory, and a plurality of peripheral devices. In a conventional computer architecture, the CPU interfaces to the various components through bridge logic. The plurality of peripheral devices interface to the CPU bridge logic over an information bus commonly referred to as the local bus. Examples of local busses include the peripheral component interconnect (PCI) bus or the Video Electronics Standards Association (VESA) VL bus. These modern local bus standards provide a higher throughput than older expansion busses because the modern local busses are not required to be backwards compatible with prior expansion bus adapters. Examples of devices which can be coupled through local expansion busses include Small Computer Systems Interface (SCSI) adapters, network interface cards, video accelerators, audio cards, and telephony cards. In addition to these various peripheral devices, an older style expansion bus may also be coupled to the local bus to provide compatibility with earlier version expansion bus adapters. Examples of such expansion busses include the industry standard architecture (ISA) bus, also referred to as the AT bus, the extended industry standard architecture (EISA) bus, and the micro-channel architecture (MCA) bus. Various devices may be coupled to the expansion bus including a fax modem and a sound card, for example.

Typically included within the bridge logic in many computer systems is a local bus arbiter. The local bus arbiter determines and prioritizes ownership of the local bus. In addition to the local bus arbiter, the bridge logic further typically includes an arbiter of the CPU host bus, which connects the CPU to the bridge logic. Ownership of either bus is typically based on a fixed arbitration fairness scheme such as a round-robin algorithm. In some situations, a master must acquire ownership of both the local bus and the CPU host bus before it can proceed with a particular transfer cycle.

Many computer systems also employ a technique called pre-fetching. For example, many microprocessors use speculative pre-fetching to attempt to fetch data or code from main memory into CPU memory prior to the time when the CPU actually requires the data or code. Ideally, speculative pre-fetches occur when the bus is not being otherwise occupied by the CPU. Because of their speculative nature, it is not certain that the processor will require the data or code and, in fact, the pre-fetched data is often discarded. In systems with multiple bus masters and in systems where bus bandwidth and bus latency are critical to performance, speculative pre-fetching can significantly degrade performance if the bus is not efficiently arbitrated. In conventional bus arbitration schemes, system performance degradation can occur when speculative pre-fetching or transfer of one bus master slows the non-speculative accessing of information by a second bus master. This type of performance degradation can be seen on, for example, systems with shared video frame buffer memory architectures.

A significant problem associated with conventional bus arbitration systems is that the bus arbiter is not designed to optimize bus availability to non-speculative bus requests. Thus, non-speculative bus requests can be preempted by a large number of speculative requests. In computer systems where the number of peripheral devices competing for the local bus bandwidth is relatively small, speculative pre-fetching by the CPU enhances the system performance by making data and instructions available to the CPU faster than could be otherwise provided. As the number and sophistication of the peripheral devices connected to the local bus is increased however, local bus bandwidth becomes increasingly precious. In systems where the CPU as well as many of the peripheral devices are performing speculative pre-fetching, non-speculative bus requests can be significantly delayed. Therefore, a new bus arbiter system and method are desirable which provide greater access to the bus, subsystems and main memory for non-speculative bus ownership requests.

SUMMARY OF THE INVENTION

The problems outlined above are in large part solved by a computer system employing a bus arbiter and method for bus arbitration in accordance with the present invention. In an improved embodiment of a bus arbitration method, a computer system is provided which includes a bus bridge coupled between a CPU host bus and a local bus. The bus bridge further includes memory controller logic for controlling data transfers between a main memory and a plurality of bus masters residing on the local bus or on the CPU host bus. A variety of peripheral devices are coupled to the local bus. Many of the peripheral devices, in addition to the CPU, request ownership of the local bus or the host bus for speculative pre-fetching and for non-speculative fetching of data or code. In a preferred embodiment, a SCSI controller, a network interface card, a video adapter, a video capture card, an audio adapter, and a telephony adapter can be coupled to the local bus. A bus arbiter is advantageously provided for controlling and prioritizing ownership of the local bus based in part upon a speculative pre-fetch indicator signal asserted by a bus master requesting ownership of the bus to perform a speculative pre-fetch. Each bus master capable of pre-fetching information is associated with a unique speculative pre-fetch signal. A relatively high level of arbitration priority is given to a bus master when it asserts a non-speculative request for bus ownership. Preferably, bus masters requesting bus ownership to perform a speculative pre-fetch will lose the arbitration until all requests for non-speculative transfers have been serviced such that speculative pre-fetches will consume system bandwidth only after all non-speculative pre-fetches have been executed.

Broadly speaking, an improved system hereof comprises a first and second bus master connected to a bus and a bus arbiter for controlling ownership of the bus. Both bus asters have REQ# signals routed to the bus arbiter for requesting ownership of the bus. The bus arbiter has a GNT# signal routed to each bus master to indicate when a particular bus master has ownership of the bus. The first bus master is capable of performing speculative pre-fetches and has an output signal SP# used to indicate when the first bus master is performing a speculative pre-fetch. The bus arbiter is configured to assign the second bus master higher priority in obtaining ownership of the bus if the SP# signal of the first bus master indicates that the first bus master is going to perform a speculative pre-fetch operation.

BRIEF DESCRIPTION OF THE DRAWINGS

Other objects and advantages of the invention will become apparent upon reading the following detailed description and upon reference to the accompanying drawings in which.

Figure 1:
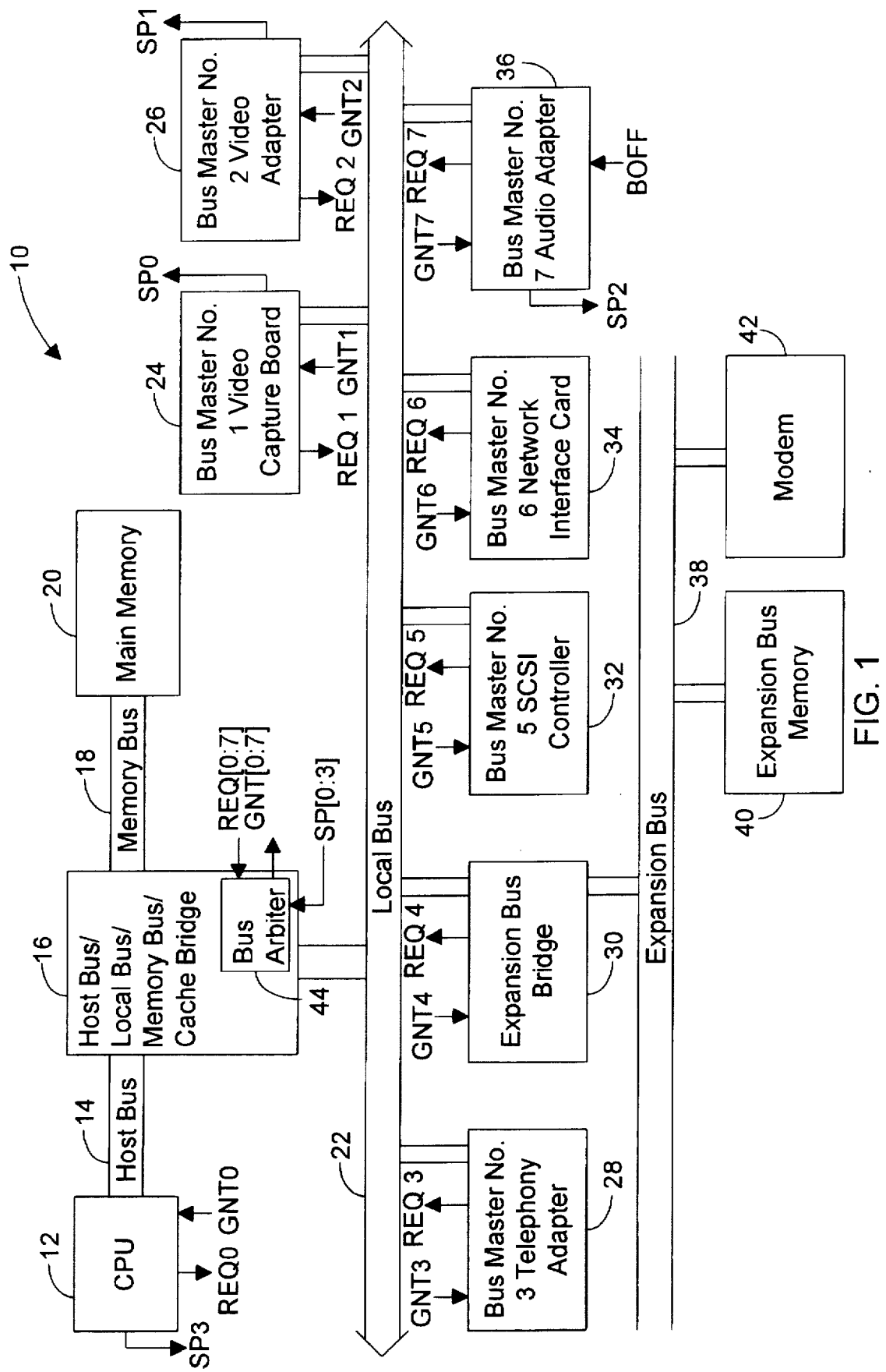
FIG. 1 is a block diagram of the computer system including a variety of bus masters and a bus arbiter in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to FIG. 1, a block diagram of a computer system incorporating a plurality of bus master peripheral devices and bus arbitration logic in accordance with one embodiment of the present invention is shown. As illustrated in the figure, computer system 10 includes a central processing unit (CPU) 12 which is coupled through a host bus 14 to a host/local bus/cache bridge 16. Bridge 16 includes memory control logic and is coupled through memory bus 18 to main memory 20. A cache memory subsystem (not shown) may further be coupled to bus bridge 16. CPU 12 typically includes an internal cache which is not shown in the drawing. Bus bridge 16 interfaces to local bus 22. In one embodiment, local bus 22 is a Peripheral Component Interface (PCI) bus. Alternatively, local bus 22 could be designed in accordance with another standard such as the Video Electronics Standard Association (VESA) VL bus. CPU 12 is illustrative of, for example, an ×86 microprocessor such as in 80486 microprocessor or a Pentium compatible microprocessor. It is understood however that the system according to the present invention may employ other types of microprocessors. It is further understood that the present invention may be employed within a multi-processing environment.

As shown in the drawing, various types of devices may be connected to local bus 22. In the embodiment depicted in FIG. 1, video capture port 24, video adapter 26, audio adapter 36, telephony adapter 28, SCSI (Small Computer Systems Interface) disc controller 32, a network interface card 34, and an expansion bus bridge 30 are coupled to local bus 22. Expansion bus 38 interfaces through expansion bus bridge 30 to local bus 22. Expansion bus 38 may be any of a variety of types, including the industry standard architecture (ISA) bus, also referred to as the AT bus, the enhanced industry standard architecture (EISA) bus, or the microchannel architecture (MCA) bus. Various devices may be coupled to expansion bus 38, including expansion bus memory 40 and a modem 42.

Bus arbiter 44, configured to control ownership of local bus 22, is illustrated as a portion of bridge 16. This will be explained in further detail below. The arbitration scheme employed by the computer system in FIG. 1 provides a unique request REQ# and a grant signal GNT# for each bus master. Whenever a particular master requires ownership of local bus 22, it asserts its associated request signal REQ#. In accordance with the invention, the requesting master may further assert a speculative pre-fetch signal SP# to indicate that the requested access relates to a speculative pre-fetch data transfer. When bus arbiter 44 detects request signal REQ#, it further determines whether a speculative pre-fetch signal corresponding to the requesting master has also been asserted. If the speculative pre-fetch signal is asserted, bus arbiter 44 assigns the requesting master a relatively low priority in its arbitration algorithm. Further details regarding the bus arbitration scheme employed by the computer system of FIG. 1 will be provided below.

As stated above, each bus master of FIG. 1 asserts a unique request signal REQ# when bus access is desired. These request signals, shown collectively as REQ[0:7], are routed to bus arbiter 44. For example, request signal REQ2 is generated by video adapter 26 and request signal REQ5 is generated by SCSI controller 32. Corresponding grant signals GNT [0:7] are similarly routed back to the masters from bus arbiter 44. It is noted that request signal REQ4 may be asserted by expansion bus bridge 30 if access of local bus 22 is required by an agent of expansion bus 38 such as modem 42. One or more of the local bus masters are further configured to assert a corresponding speculative pre-fetch signal SP# which is provided to bus arbiter 44 when bus access is requested. Assertion of a particular speculative pre-fetch indicator signal indicates that the requesting master is ready to initiate a speculative pre-fetch data transfer.

Figure 2:
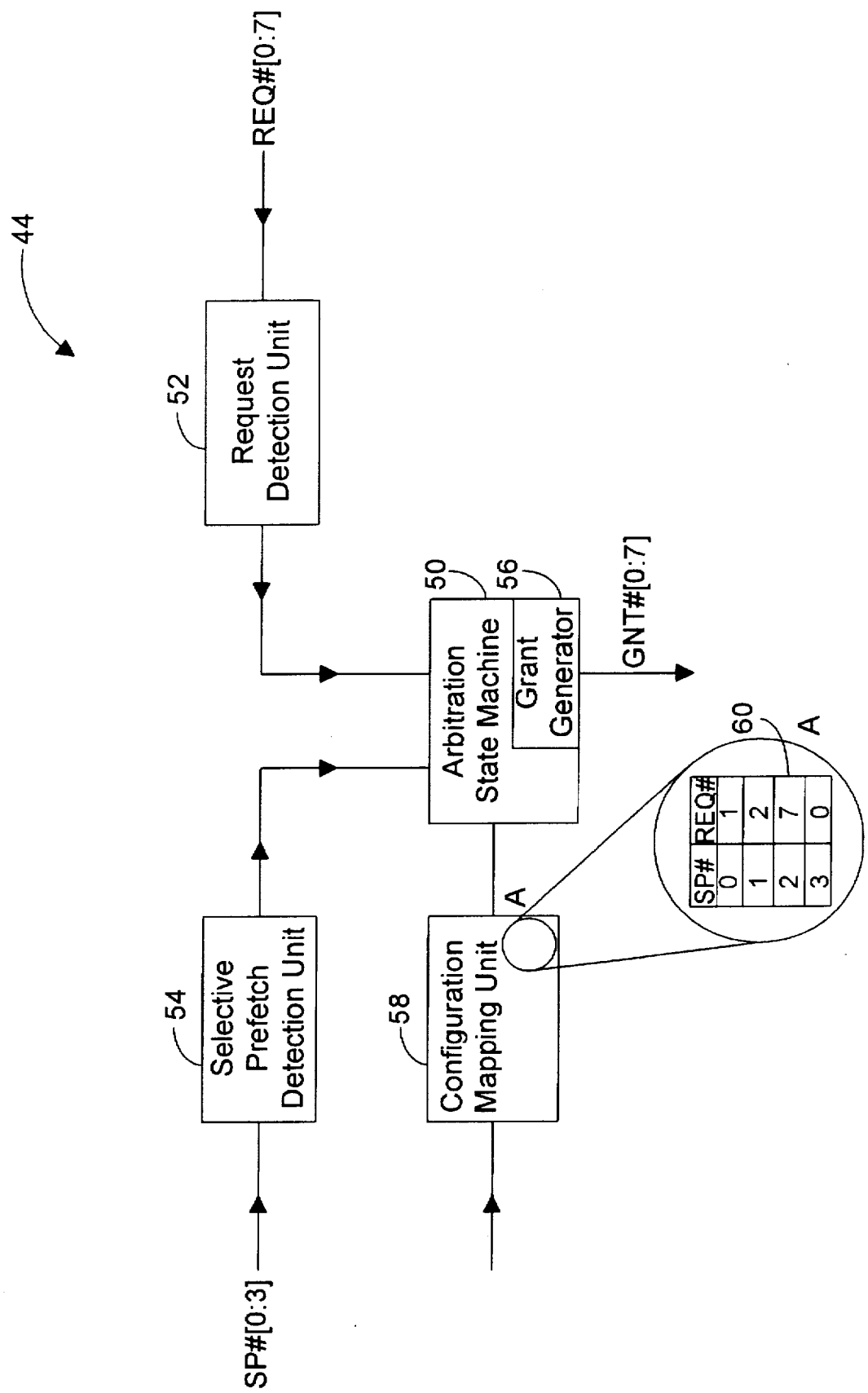
FIG. 2 is a block diagram depicting internal portions of the bus arbiter of FIG. 1.

FIG. 2 depicts internal portions of bus arbiter 44. As shown, bus arbiter 44 includes an arbitration state machine 50 coupled to a request detection unit 52, a speculative pre-fetch detection unit 54, a grant generator 56, and a configuration mapping unit 58. A programmable assignment table 60 is additionally shown incorporated into configuration mapping unit 58. Configuration mapping unit 58 is provided to map each speculative request indicator signal SP[0:4] to a designated request signal REQ#. Assignment table 60 is provided to allow software programming of the configuration mapping unit 58. By utilizing this programmable mechanism, it is noted that the number of speculative pre-fetch indicator signals SP# may be less than the total number of local bus masters, thus minimizing pin count while advantageously allowing programmable flexibility in assigning speculative pre-fetch signals SP[0:3] to any of the request signals REQ[0:7]. As shown in exploded view "A" of FIG. 2, speculative pre-fetch signal SP0 is mapped to request signal REQ1, speculative pre-fetch signal SP1 is mapped to REQ2, speculative pre-fetch signal SP2 is mapped to REQ7, and speculative pre-fetch SP3 is mapped to REQ0. Different mappings may be programmed as desired depending upon the system configuration. It is noted that in typical operation, mapping of speculative pre-fetch indicator signals SP[0:3] is performed during initialization of the computer system. It is specifically contemplated that in an alternative configuration a dedicated speculative pre-fetch signal SP# may be associated with each request signal, and that in such a configuration, configuration mapping unit 58 and assignment table 60 may be omitted.

Arbitration state machine 50 is configured to transition between several bus arbitration states depending upon assertions from bus request signals REQ[0:7] detected by request detection unit 52. Transitions between the various arbitration states of arbitration state machine 50 are further dependent upon the speculative pre-fetch indicator signals SP[0:3] received by speculative pre-fetch detection unit 54. In one embodiment, arbitration state machine 50 is configured to prioritize incoming bus request based upon a round-robin prioritization scheme, assuming that no other requests are associated with a speculative pre-fetch signal SP#. For example, consider a situation where all request signals REQ[0:7] are asserted, thus indicating that all local bus masters are currently requesting access to local bus 22. These assertions are detected by request detection unit 52. Assuming that none of the speculative pre-fetch indicator signals SP# are also asserted, state machine 50 initially grants ownership of the bus to, for example, the master asserting request signal REQ0. Upon the next bus grant cycle, arbitration state machine 50 grants ownership to the master asserting request signal REQ1 and so on in a round-robin fashion. For each bus grant cycle, arbitration state machine 50 causes grant generator 56 to assert a corresponding grant signal GNT# to indicate the winner of the current arbitration cycle.

If a particular requesting master asserts its request signal REQ# and asserts its speculative pre-fetch signal SP#, state machine 50 assigns a lower priority to the requesting master in comparison to a priority it would have received if the speculative pre-fetch indicator signal had not been asserted. That is, the priority for a particular bus master's request is lowered if the request is accompanied by a corresponding speculative pre-fetch signal. In one embodiment, whenever a requesting master asserts its speculative pre-fetch indicator signal SP# and contends with other requesting masters (which are not asserting associated speculative pre-fetch indicator signals), the master that is not asserting its speculative pre-fetch indicator signal takes precedence in obtaining ownership of the bus. When several requesting masters each asserts speculative pre-fetch indicator signals, arbitration state machine 50 arbitrates those requests in a round-robin fashion, after it has serviced all bus requests which are not associated with speculative pre-fetch signals. This operation ensures that non-speculative requests are serviced expeditiously. Accordingly, a relatively large number of peripheral devices may be employed within a computer system while maintaining proper overall operation. It is noted that the system in FIG. 1 may be configured to allow the system programmer to disable the speculative pre-fetch signal of a particular master device. For this purpose, a particular bus master may include a register such as register 27 shown within video adapter 26, which can be set under software control to prevent a master from asserting its associated speculative pre-fetch signal. If the programmer determines that the priority of a particular bus master's requests should not be downgraded, regardless of whether the master is requesting the bus for a speculative or for a non-speculative fetch, the programmer can utilize register 27. When register 27 is set appropriately, the bus master is prevented from asserting its associated speculative pre-fetch signal SP#. Thus, bus arbiter 44 will interpret each request from the bus master as a non-speculative request.

Figure 3:
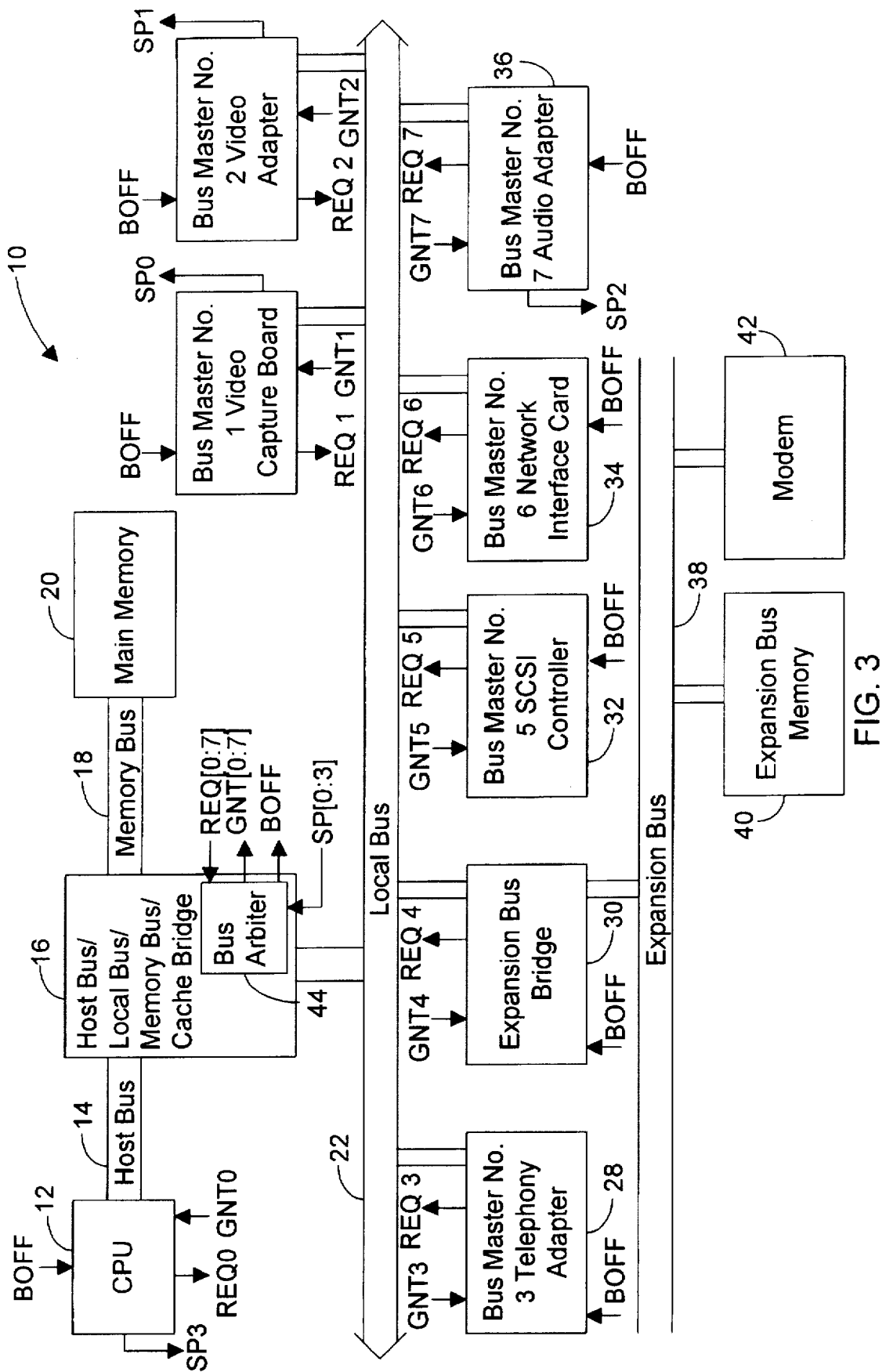
FIG. 3 is a block diagram of an alternative embodiment of an improved bus monitor depicting incorporation of the BOFF signal.

In an embodiment depicted in FIG. 3, an additional signal, denoted as BOFF, is incorporated into system 10. BOFF is generated by bus arbiter 44 and routed to each bus master. BOFF can be used to cause a bus master to relinquish ownership of or "backoff" local bus 22. In the embodiment of FIG. 3, each bus master is configured to relinquish local bus 22 in response to the BOFF signal if the master currently owns local bus 22. For all remaining bus masters, the presence of the BOFF signal will have no effect. Suppose, for example, that bus master 24 currently owns local bus 22 and that bus master 24 is executing a speculative pre-fetch. Now further suppose that bus arbiter 44 receives a REQ# signal from a bus master that is requesting ownership of local bus 22 to perform a non-speculative access. In the absence of the BOFF signal, the non-speculative access would have to wait until the conclusion of bus master 24's speculative pre-fetch. By using the BOFF signal, arbiter 44 can inform bus master 24 that a higher priority bus request has arrived, thus signaling bus master 24 to backoff local bus 22. In response to the detection of the BOFF signal, bus master 24 will release local bus 22 by "floating" its connections to local bus 22. Once local bus 22 has been relinquished by bus master 24, arbiter 44 can assign ownership of local bus 22 to a bus master requesting the bus to perform non-speculative accesses. In this manner, a non-speculative access request can be prioritized over a speculative pre-fetch request not just when the two requests are pending simultaneously, but also when the non-speculative access request arrives at arbiter 44 after local bus 22 has been granted to a master performing a speculative pre-fetch.

Figure 4:
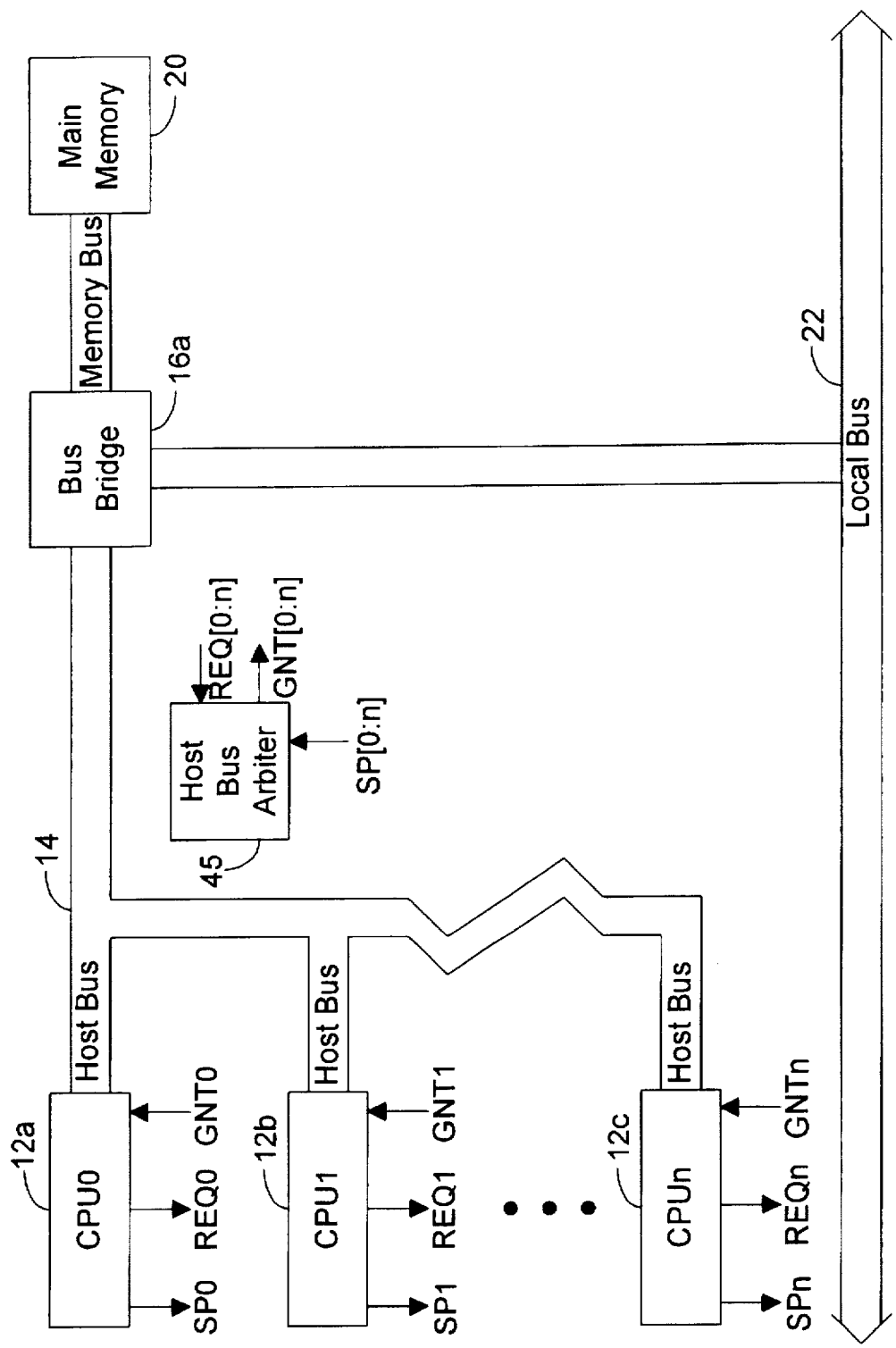
FIG. 4 is a block diagram of an alternative embodiment disclosing an improved bus arbiter used in a multi-processor system.

FIG. 4 depicts an embodiment incorporating multiple central processing units (CPUs) 12a, 12b and 12c and host bus arbiter 45. Each CPU can access main memory 20 and local bus 22 through bus bridge 16a. Host bus arbiter 45 is responsible for monitoring and assigning ownership of host bus 14. Each CPU has a REQ# signal routed to host bus arbiter 45 for requesting ownership of host bus 14 and an SP# signal routed to host bus arbiter 45 for informing arbiter 45 when the CPU is requesting ownership of host bus 14 to perform a speculative pre-fetch. Host bus arbiter 45 has a plurality of GNT# signals, one GNT# routed to each CPU, for indicating to each CPU when host bus arbiter 45 has granted ownership host bus 14 to the CPU. Host bus arbiter 45 is configured such that, when a first CPU asserts its REQ1 signal and its SP1 signal and a second CPU asserts its REQ2 signal (but not its SP2 signal), arbiter 45 assigns a higher priority to the second CPU in response to the first CPU's SP1 signal. Because the SP# signal indicates when a particular CPU is requesting ownership of the bus to perform a speculative pre-fetch, arbiter 45's configuration results in non-speculative type bus requests being assigned a higher priority than speculative requests.

Numerous variations and modifications will become apparent to those skilled in the art. Once the above disclosures will be appreciated, it is intended that the following claims be interpreted to embrace all such variations and modifications.

What is claimed is:

1. An improved bus arbitration system, comprising:

an information bus;

a first bus master connected to said information bus, said first bus master adapted to speculatively pre-fetch and having a first REQ signal for requesting ownership of said bus and an SP signal for indicating a speculative pre-fetch operation;

a second bus master connected to said information bus and having a second REQ signal for requesting ownership of said bus; and a bus arbiter adapted to receive said first REQ signal, said second REQ signal, and said SP signal and wherein said bus arbiter is configured to assign said second bus master higher bus request priority than said first bus master in response to said SP signal when said first REQ signal, said second REQ signal, and said SP signal have been asserted.

2. The bus arbitration system of claim 1 wherein said bus arbiter further comprises first and second GNT signals routed to said first and second bus masters for indicating permission to take ownership of said bus in response to said first and second REQ signals.

3. The bus arbitration system of claim 1 wherein said bus arbiter further comprises a BOFF signal routed to said first and second bus masters for withdrawing ownership of said bus from said first and second bus masters.

4. The bus arbitration system of claim 3 wherein said bus arbiter is further configured to assert said BOFF signal when said second REQ signal is asserted while said first bus master has ownership of said bus and said first bus master is speculatively pre-fetching.

5. The bus arbitration system of claim 1 wherein said first and second bus masters comprise first and second central processing units.

6. The bus arbitration system of claim 1 wherein said information bus comprises a PCI local bus.

7. An improved bus arbitration system of the type having first and second bus masters connected to said bus and a bus arbiter for controlling ownership of said bus, each said first and second bus masters having a bus ownership request signal routed to said bus arbiter, said bus arbiter having first and second bus ownership grant signals routed to said first and second bus masters respectively for indicating ownership of said bus in response to said bus ownership request signal, said first bus master requesting ownership of said bus to perform a speculative pre-fetch information transfer and said second bus master requesting ownership of said bus to perform a non-speculative information transfer, wherein the improvement comprises:

a speculative pre-fetch signal generated by said first bus master and routed to said bus arbiter, said speculative pre-fetch signal indicating whether said master is requesting ownership of said bus to perform speculative pre-fetch data transfers; and wherein said bus arbiter is configured to assign said first bus ownership request lower priority than said second bus ownership request signal in response to said speculative pre-fetch signal.

8. The system of claim 7 wherein said first bus master comprises a first central processing unit.

9. The system of claim 8 further comprising one or more additional central processing units connected to said bus wherein each said additional processing unit is connected to said bus, each said additional central additional processing unit having a bus ownership request signal routed to said bus arbiter and a bus grant signal from said bus arbiter.

10. The system of claim 7 wherein said bus arbiter is further configured to backoff a bus ownership grant for a speculative pre-fetch in response to a subsequent non-speculative bus ownership request.

11. A method of arbitrating ownership of an information bus comprising the steps of:

requesting a bus arbiter connected to said bus for ownership of said information bus by a first bus master connected to said bus, said first bus master adapted to speculatively pre-fetch;

sending a speculative pre-fetch signal from said first bus master to said bus arbiter;

requesting said bus arbiter for ownership of said bus by a second bus master connected to said bus; and prioritizing said second request over said first request in response to said speculative pre-fetch signal.

12. The method of claim 11 wherein said first bus master's request and said speculative pre-fetch signal are asserted simultaneously.

13. The method of claim 11 wherein said first and second bus masters comprise central processing units.

14. The method of claim 11 further comprising the step of granting ownership of said bus to said second bus master in response to said second request.

15. The method of claim 11 wherein said information bus comprises a PCI bus.

* * * * *